United States Patent [19]

Hoffmann

[11] Patent Number: 4,705,615

[45] Date of Patent: Nov. 10, 1987

[54] ELECTRODE ARRANGEMENT FOR THE ELECTROCHEMICAL METAL EROSION PROCESS FOR PRODUCING A TOOTH SYSTEM

[75] Inventor: Gerhard Hoffmann, Berglen, Fed. Rep. of Germany

[73] Assignee: Daimler-Benz Aktiengesellschaft, Stuttgart, Fed. Rep. of Germany

[21] Appl. No.: 893,212

[22] Filed: Aug. 5, 1986

[30] Foreign Application Priority Data

Aug. 5, 1985 [DE] Fed. Rep. of Germany ....... 3528056

[51] Int. Cl.⁴ .......................... B23H 3/04; B23H 9/12
[52] U.S. Cl. .................................. 204/289; 204/224 M
[58] Field of Search ................. 204/224 M, 225, 280, 204/289

[56] References Cited

U.S. PATENT DOCUMENTS

| | | | |
|---|---|---|---|
| 3,288,699 | 11/1966 | Trager et al. | 204/224 M |
| 3,458,424 | 7/1969 | Bender | 204/289 X |
| 3,467,593 | 9/1969 | Dickson et al. | 204/289 X |
| 3,499,830 | 3/1970 | Haggerty et al. | 204/224 M |
| 3,553,095 | 1/1971 | Daniel | 204/224 M |
| 3,630,878 | 12/1971 | Haggerty | 204/280 X |
| 4,394,243 | 7/1983 | Hoffmann | 204/284 |

OTHER PUBLICATIONS

ISO International Standard, 42871/1, p. 14, Points 5.7.

*Primary Examiner*—Donald R. Valentine
*Attorney, Agent, or Firm*—Barnes & Thornburg

[57] ABSTRACT

An electrode arrangement for the electrochemical metal erosion process for producing a radial cylindrical tooth system is provided by the present invention. This arrangement has a metal plate forming the electrode which is provided with a ring of tongues, and an insulator ring which is arranged radially resiliently and presses against the crests of the produced teeth. Burn-free radial cylindrical tooth systems with improved precision are produced with the electrode arrangement according to the invention.

14 Claims, 3 Drawing Figures

ELECTRODE ARRANGEMENT FOR THE ELECTROCHEMICAL METAL EROSION PROCESS FOR PRODUCING A TOOTH SYSTEM

BACKGROUND AND SUMMARY OF THE INVENTION

The present invention relates to an electrode arrangement for the electrochemical metal erosion process (ECM process), Particularly for producing a tooth system with closely juxtaposed teeth which are arranqed on the circumference of a hollow shaft (a radial cylindrical tooth system).

A cathode for the electrochemical metal erosion process is shown in U.S. Pat. No. 4,394,243, which is suitable for producing a precision ring gear on the end face of a hollow shaft or the like. This cathode consists of a metal plate which is provided with perforations for the production of this tooth system fitted on the end face of the hollow shaft. No material is eroded in the places where the perforations are present in the sheet metal ring. In other words, a tooth is produced during sinking, whereas, at those points where the web is present in the sheet metal ring, the metal is eroded. In order that the crests of the resulting teeth are not attacked during the sinking, thereby losing their sharp-edged contour, the metal plate is masked on the rear side with a resiliently attached insulator plate. This plate presses protectively against the crests of the resulting teeth during the sinking to Prevent any electrolytic attack at this point. Excellent dimensionally accurate ring gears reproducible with narrow tolerances can be produced on the end face of hollow shafts or the like with this cathode. However, this cathode is not suitable for the production of teeth on the circumference of a hollow shaft.

It is therefore an object of this invention to provide an electrode arrangement for the electrochemical metal erosion process with which high-precision tooth systems can be produced on the circumference of a hollow shaft or the like.

This and other objects are acheived by providing in an electrochemical metal eroding electrode arrangement a metal plate extending transversely to the sinking direction, and a resiliently attached insulator ring for protecting the crests of the produced tooth system. The metal plate has a ring with a plurality of tongues, with the perforations between the tongues conforming with the tooth system to be produced. The insulator ring is arranged radially resiliently such that its inner surfaces are pressed against the crests of the produced tooth system.

As described above, a preferred embodiment of an electrode arrangement according to the invention comprises a metal plate extending transversely to the sinking direction for the production of spur tooth systems or external tooth systems. This metal plate is provided with a ring of tongues, in preferred embodiments the length of which is dimensioned so that a gap of 1 to 2 mm is produced between the addendum circle diameter of the tooth sYstem and the dedendum circle diameter of the tongue ring. The root of the tongues is braced in preferred embodiments by an at least two-part compression-resistant insulator ring which is arranged to be radially resilient and presses against the crests of the resulting piece. The radius of the insulator ring differs in preferred embodiments by a maximum of 0.01 mm from the addendum circle diameter of the tooth system to be sunk, is ground to a surface roughness depth of $R_z 6.3$ or better, and its circumferential edges are sharp-edged.

On the one hand, the sheet metal thickness of the tongues should be chosen as small as possible in order to minimize the attack on the flank of the profile; but on the other hand, an adequate useful life and mechanical stability of the electrode plate are also required. Sheet metal thicknesses up to 1 mm are therefore generally adopted in preferred embodiments depending upon the characteristics of the sheet metal and on the required precision of reproduction of the profile. It is not generally worthwhile going below a sheet metal thickness of 0.4 mm, because the mechanical stability and durability of tongues are then too low. It has been found most advantageous to use a metal plate of stainless steel or brass with a thickness of 0.5 to 0.7 mm. The production of the tongues from the sheet metal can be effected particularly simply by cutting, stamping or etching, because large quantities of material do not have to be removed.

The production of the insulator ring which comes into contact with the crests of the resulting teeth must be performed particularly precisely so that the ring has its desired effect. A compression-resistant material, for example ceramics, hard plastics such as phenolic resins, polyamide, PTFE and the like are used as the material for the insulator ring in preferred embodiments. Soft materials such as rubber and the like, are unsuitable. The radius of the insulator ring to be produced may differ by a maximum of 0.01 mm from the addendum circle diameter of the tooth system to be sunk, because otherwise an attack on the crests of the resulting teeth is observed. To enable the ring to press radially resiliently against the crests of the resulting teeth, it should comprise at least two parts. The joints between the ring parts are conveniently placed so that they lie in tooth gaps.

It has been found advantageous for the insulator ring to be ground to a surface roughness depth of approximately $R_z = 6.3$ or better in the radial direction on the side in contact with the tooth crests. If this surface roughness is exceeded, then a noticeable impairment of the profile of the tooth crests is observed. Particularly good results are obtained if the grinding is performed in the radial or circumferential direction. A further advantageous feature of a preferred embodiment of the insulator ring is that its circumferential edges are sharp-edged, at least on the side facing towards the teeth. It has been found that, in the case of rings which have broken circumferential edges, the electrolyte flow is disturbed, with the consequence of unsatisfactory results. The insulator ring has to not only provide protection of the resulting tooth crests, but also functions to brace the root of the tongues and thereby increase the mechanical stability of the electrode, and to lead the electrolyte deliberately to the treatment position. It also reduces the electrolyte flow, which results in a reduced pump output for the electrolyte supply and therefore saves energy. It is important for the electrolyte routing, as just mentioned, that the circumferential edges of the insulator ring are sharp-edged on the side pointing towards the crests of the teeth.

It has also been discovered that the sinking speed can be increased quite substantially if that part of the tongues which is to be sunk into the workpiece to be treated is bent backwards, for example at angles of 30 to 45 degrees, out of the plane which is perpendicular to the sinking direction. Therefore only that part of the tongues which is to be sunk is bent, because otherwise the insulator ring would have to be provided with a chamfer which, however, as stated, should not be present Further objects, features and advantages of the present invention will become more apparent from the following description when taken with the accompanying drawings, which show for purpose of illustration only, an embodiment constructed in accordance with the present invention.

DETAILED DESCRIPTION OF THE DRAWINGS

Figure 1:
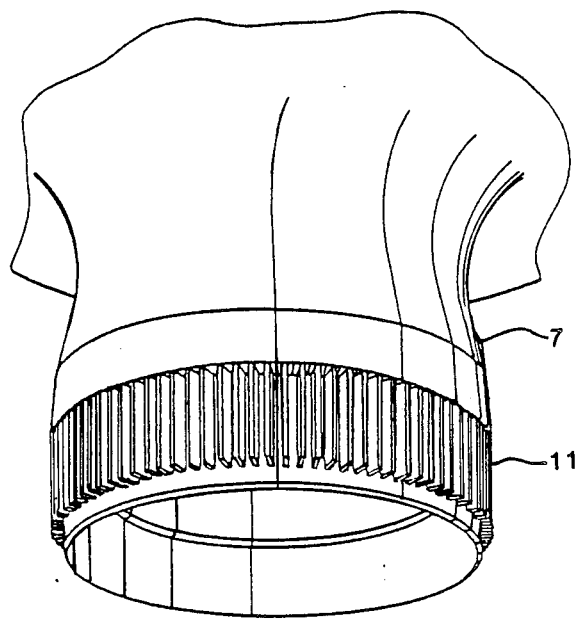
FIG. 1 shows an example of a rotor with a male tooth system produced by a preferred embodiment of the present invention.
Figure 2:
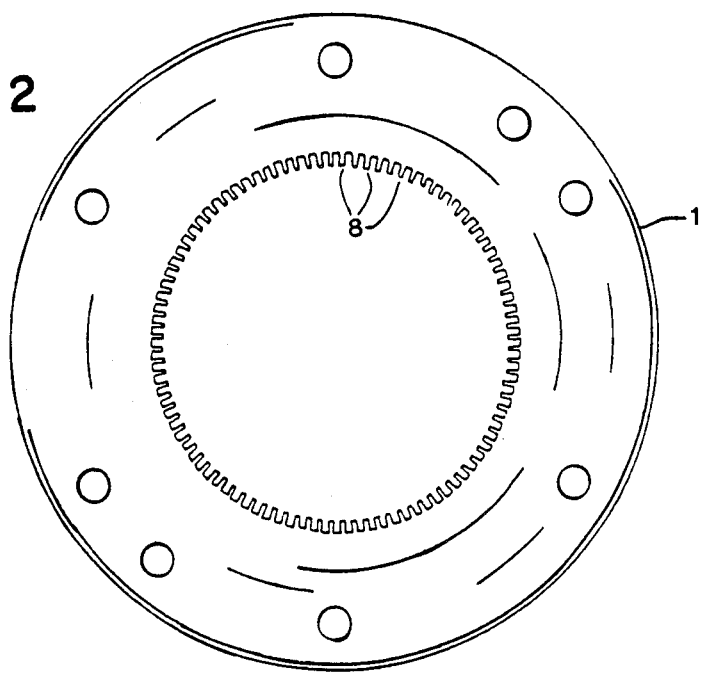
FIG. 2 shows a preferred embodiment of a sheet metal electrode with tongues.
Figure 3:
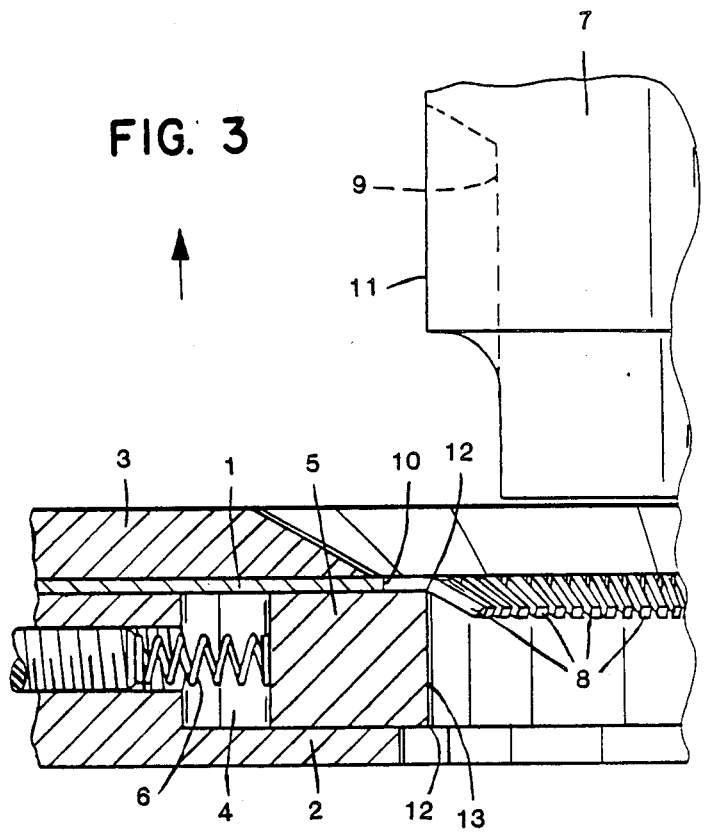
FIG. 3 shows an enlarged diametrical partial section of the embodiment of FIG. 2 incorporated in an electrode support.

The electrode 1 illustrated in FIG. 2 may be seen in FIG. 3, clamped between the electrode support 2 and a retaining ring 3 screwed onto the latter. The electrode support 2 is provided with a recess 4 in which the insulator ring 5 comprising two half-shells is movably arranged. The insulator ring 5 is pressed inwards by means of the spring 6. The workPiece 7 to be treated is the blank for the rotor with the male tooth sYstem illustrated in FIG. 1.

During the electrochemical sinking the electrode arrangement is moved in the direction of the arrow in FIG. 3 and the penetrating tongues 8 on the electrode 1 generate on the edge of the workpiece 7 the tooth system illustrated by the dashnnn-line 9 in the workpiece 7. The length of the tongue 8 is dimensioned so that during the sinking of the tongues into the workpiece 7 a gap of approximately 1 to 2 mm is present between the tongue root 10 and the crests 11 of the resulting teeth.

During the sinking the insulator ring 5 contacts the crests of the resulting teeth 11. The inside radius of the insulator ring 5 is dimensioned so that a maximum deviation of 0.01 mm from the addendum circle diameter of the tooth system 11 in the workpiece 7 results. The circumferential edges 12 of the insulator ring 5 must be sharp-edged in order to ensure proper functioning of the arrangement. As shown in FIG. 3, the tongues 8 are bent backwards at 30 to 45 degrees out of a plane which is perpendicular to the sinking direction in the region in which they penetrate the workpiece 7. This bending must be performed only on that part of the tongues which is to be sunk, because otherwise either the insulator ring 5 could not contact the crests 11, or the insulator ring 5 would have to be provided with a chamfer at the points 12, both of which would lead to a defective tooth system. The surface 13 of the insulator ring 5, which contacts the crests 11 of the tooth system, is ground in the radial direction to a surface roughness of $R_z=6.3$ or better. A satisfactory quality of the crests of the resulting teeth cannot be achieved without such grinding.

The hub illustrated as a specimen in FIG. 1 has an addendum circle diameter of the tooth system of 72 mm and has 96 teeth. The tooth width is $1\pm0.1$ mm, the tooth gap width is $1.35\pm0.1$ mm and the tooth system depth is $$1.5 \pm {0.35 \atop 0.1} \text{ mm.}$$

The radius of the transition from the tooth flanks into the tooth crests is 0.15 mm with a maximum error of $\pm0.1$ mm. The tooth spacing error is a maximum 0.02 mm, and the center offset of the teeth a maximum 0.1 mm. Such precise spur tooth systems cannot be obtained with the electrode arrangements hitherto known.

The electrode arrangement according to the invention is suitable not only for producing spur tooth systems with parallel tooth flanks, but also for producing spur tooth systems with any desired tooth cross sections, such as trapezoidal or involute for example. If the electrode arrangement is simutaneously subjected to a rotary movement during the sinking, then helical tooth profiles can also be produced.

Although the present invention has been described and illustrated in detail, the same is by way of illustration and examply only, and is not to be taken by way of limitation. The spirit and scope of the present invention are to be limited only by the terms of the appended claims.

What is claimed is:

1. Electrode arrangement for the electrochemical metal erosion process (ECM process) for producing a tooth system on a blank, having a metal plate extending transversely to a sinking direction and perforated in conformity with the tooth system to be produced, and a resiliently attached insulator ring which presses protectively against the crests of the resulting teeth during the sinking, wherein the metal plate is provided with a ring of tongues, the length of which is dimensioned so that a gap of 1 to 2 mm is produced between the addendum circle diameter of the tooth system and the dedendum circle diameter of the tongue ring, and that the root of the tongues is braced by an at least two-part compression-resistant insulator ring which is arranged radidlly resiliently and presses against the crests of the resulting teeth on said blank and the inside radius of said ring differs by a maximum of 0.01 mm from the addendum circle diameter of the tooth system to be sunk, said ring being ground to a surface roughness depth of $R_z6.3$ or better, and the circumferential edges of said ring of which are sharp-edged.

2. An electrode arrangement according to claim 1, wherein the part of the tongues which is to be sunk into the workpiece to be treated is bent backwards at 30 to 45 degrees out of the plane perpendicular to the sinking direction.

3. An electrode arrangement for the electrochemical metal eroding of a workpiece for producing a tooth system on said workpiece said arrangement comprising:
   a metal plate extending transversely to a sinking direction, the metal plate having a ring with a plurality of tongues with perforations between the tongues conforming with the tooth system to be produced,
   and a resiliently attached insulator ring for protecting crests of the produced tooth system, said insulator ring being arranged radially resiliently such that its inner surfaces are pressed against said crests of the produced tooth system.

4. The arrangement of claim 3, wherein the length of the tongues is such that a gap of 1 to 2 mm exists between an addendum circle diameter of the produced tooth system and a dedendum circle diameter of the tongue ring.

5. The arrangement of claim 4, wherein the insulator ring has an inner radius with a diameter that differs from said addendum circle diameter by a maximum of 0.01 mm.

6. The arrangement of claim 5, wherein the insulator ring comprises at least two parts.

7. The arrangement of claim 6, wherein the tongues have roots which are braced by said insulator ring.

8. The arrangement of claim 7, wherein the insulator ring is ground to a surface roughness of $R_z=6.3$ or better.

9. The arrangement of claim 8, wherein said insulator ring has circumferential edges which are sharp-edged.

10. The arrangement of claim 9, wherein the insulator ring is resistent to compression.

11. The arrangement of claim 10, wherein only a portion of the tongues are sunk into said workpiece, said portion being bent backwards against the sinking direction from a plane perpendicular to the sinking direction.

12. The arrangement of claim 11, wherein said portions are bent 30 to 45 degrees from said plane.

13. The arrangement of claim 3, wherein only a portion of the tongues are sunk into said workpiece, said portion being bent backwards against the sinking direction from a plane perpendicular to the sinking direction.

14. The arrangement of claim 13, wherein said portions are bent 30 to 45 degrees from said plane.

* * * * *